United States Patent [19]

Crago

[11] 4,364,452
[45] Dec. 21, 1982

[54] PULSE LIQUID FEEDER SYSTEM OF THE TYPE USED IN LUBRICATIONS SYSTEMS AND THE LIKE HAVING BROKEN LINE AND FLOW RATE DETECTION

[75] Inventor: Terril M. Crago, Seal Beach, Calif.
[73] Assignee: Standun, Inc., Compton, Calif.
[21] Appl. No.: 196,651
[22] Filed: Oct. 14, 1980
[51] Int. Cl.³ .............................................. F01M 1/06
[52] U.S. Cl. .................................... 184/7 E; 184/7 F; 137/624.14
[58] Field of Search ...................... 184/7 F, 7 E, 7 D; 137/624.14

[56] References Cited

U.S. PATENT DOCUMENTS

| | | | |
|---|---|---|---|
| 2,834,433 | 5/1958 | Higgens | 184/7 E |
| 3,409,104 | 11/1968 | Acker et al. | 184/7 E |
| 4,186,821 | 2/1980 | Wegmann | 184/7 D |
| 4,194,593 | 3/1980 | Snow et al. | 184/7 E X |

FOREIGN PATENT DOCUMENTS 1199553 8/1965 Fed. Rep. of Germany ...... 184/7 E

*Primary Examiner*—David H. Brown
*Attorney, Agent, or Firm*—Mahoney & Schick

[57] ABSTRACT

Each feeder cylinder, in addition to opposite end feeder chambers, had intermediate chambers formed in the piston at opposite sides of the centerline thereof alternately in fluid communication with the feeder chambers of another of the feeder cylinders. Additionally, each feeder cylinder has a monitoring cylinder in flow communication with the feeder chambers thereof arranged such that when lubricant is forced from a feeder chamber of a particular feeder cylinder to the associated bearing, less than one-half of the lubricant received at that bearing is forced by back pressure to one of the monitoring chambers of the associated monitoring cylinder. Thus, for each of the opposite strokes of a feeder cylinder, one associated bearing of a pair receives a major quantity of lubricant and the other bearing of that pair a minor quantity of lubricant while the associated monitoring cylinder is forced through one of its alternate strokes in supplying the minor quantity of lubricant. Use of indicating rods and appropriately positioned proximity sensors indicate monitoring cylinder piston movements. Therefore, if any lubrication line to any bearing fails, it will be detected since the associated monitoring cylinder piston will cease movement. Furthermore, lubricant flow rate to bearings may be calculated by detecting the number of monitoring cylinder piston movements in a given period of time.

37 Claims, 6 Drawing Figures

PULSE LIQUID FEEDER SYSTEM OF THE TYPE USED IN LUBRICATIONS SYSTEMS AND THE LIKE HAVING BROKEN LINE AND FLOW RATE DETECTION

BACKGROUND OF THE INVENTION

This invention relates to a pulse liquid feeder system of the type used in lubrication systems and the like and, more particularly, to such a pulse liquid feeder system of a unique form having preferably both broken line detection and flow rate detection. Thus, if any liquid flow line in the system being pulse fed should fail, the broken line detection of the system will immediately reveal not only that a liquid flow line has failed, but which liquid flow line has failed. Furthermore, with the unique detection of the pulse liquid feeder system, it is possible to detect the number of pulses supplied in a given period of time so as to determine liquid flow rate.

Various pulse liquid feeder systems have heretofor been provided such as the pulse lubrication feeder systems of industrial manufacturing presses and similar machines for lubricating certain of the important bearings thereof. For instance, as a prime example, large, high speed blank and draw presses used in the can making industry have multiple sets of crank arm bearings which must be retained liquid lubricated at all times during the high speed running of the press. This has been effectively accomplished through the use of pulse lubrication feeder systems.

A pulse lubrication feeder system, in this instance, may be comprised of, say, three feeder cylinders, each pulse lubricant feeding a set of bearings. Considering an individual feeder cylinder, liquid lubricant is alternately fed into opposite end, feeder chambers thereof to reciprocate a piston alternately movable from within one feeder chamber into the other feeder chamber. In this manner, with the piston in one feeder chamber, the feeding of liquid lubricant into that feeder chamber causes the piston to move into the other feeder chamber forcing liquid lubricant already in that feeder chamber to be forced into one of the bearings. This, followed by liquid lubricant feeding into the other feeder chamber causes the first feeder chamber to lubricate the second bearing, all of which is continued on an alternate basis.

By the use of multiple feeder cylinders in the same feeder system similarly liquid lubricant flow connected each to separate sets of bearings, one feeder cylinder of the system may be used to alternately feed liquid lubricant to the feeder chambers of the next and the next similarly for still the next. This is done by providing each feeder cylinder with intermediate chambers formed in the pistons thereof at opposite sides of the piston centerline but at all times spaced from the feeder chambers thereof. By directing the supply of liquid lubricant from a main supply through the intermediate chambers of one feeder cylinder for supplying the feeder chambers of another of the feeder cylinders, it is possible to provide such supply alternately to the feeder chambers of each feeder cylinder in order. This results in a highly efficient pulse liquid lubricant feeder system for pulse lubricating a multiplicity of bearings of a single machine.

Although the pulse lubrication systems of industrial manfacturing machines such as the blank and draw presses used in the can making industry have performed satisfactorily to the extent constituted, one of the principal difficulties therewith has been the lack of broken lubricant line detection. Of course, broken line detection in the lubricant flow line to the main lubricant supply for the overall pulse lubricant feeder system is relatively easy merely by a single flow detection device for that main supply line, but once the lubricant enters and leaves the feeder chambers of the individual feeder cylinders within the system, from that point on, broken line detection is much more difficult. Once the lubricant has left the various of the feeder cylinders, there is no indication of a broken lubricant flow line which could be detected from ahead any of the feeder cylinders, that is, from the main lubricant supply since the feeder cylinders will continue to feed lubricant therebeyond toward the particular bearings being pulse fed regardless a broken lubricant line beyond these cylinders. Thus, the only way to detect broken lubricant lines beyond the feeder cylinders of the system is to provide individual indicators in each lubricant line as close as possible to the bearing being fed so that a multiplicity of such indicators is required equivalent to the number of bearings being lubricated and this can become not only quite difficult due to the high speed movements of the bearing locations, but also quite expensive.

However, broken lubricant line detection is extremely vital as far as the bearings of a high speed industrial production machine, such as the blank and draw presses in the can making industry, are concerned. Obviously, lack of lubrication to any vital bearing under high speed conditions will quickly destroy that bearing requiring the shutdown of operation of the machine and the very likely total shutdown of an entire mass production line. Furthermore, the replacement of the damaged bearing in the production machine is time consuming and quite costly.

Another vital consideration in lubrication systems of high speed production machines is that of flow rate detection. In other words, it can be quite important to overall bearing life in high speed production machines to know the flow rate and constantly monitor that flow rate of the lubricant flow to each individual of the vital bearings. This is normally not done since, again, where pulse lubricant feeder systems are involved, the exact same problems are involved as with broken lubricant line detection, that is, the requirement that a flow rate detection device be incorporated in the lubricant line closely adjacent each of the bearings to be monitored with the consequent difficulties and expense.

OBJECTS AND SUMMARY OF THE INVENTION

It is, therefore, an object of this invention to provide a pulse liquid feeder system of the type used in lubrication systems and the like in which broken lubricant line detection closely adjacent the lubricant requiring elements being fed is greatly simplified and the problems with the prior constructions are eliminated. Assuming a pulse liquid feeder system of simplified form having a single alternately acting feeder device with an alternately movable divider moving into and from opposite feeder chambers, a double acting feeder cylinder with piston being one example thereof, this alternately acting feeder device is not only oppositely flow connected to a pair of flow restrictors most frequently including bearings or other lubricant requiring elements, but also to an alternately acting monitoring device of similar character to the feeder device but of smaller capacity. That is, one feeder chamber of the feeder device is flow connected to one lubricant requiring element and to one monitoring chamber of the monitoring device, and the other feeder chamber of the feeder device is flow connected to the other lubricant requiring element and the other monitoring chamber of the monitoring device.

Thus, by feeding liquid, in this example liquid lubricant, from a main supply alternately into the feeder chambers of the feeder device, lubricant will be fed from the one feeder chamber simultaneously to the one lubricant requiring element and the one monitoring chamber of the monitoring device which will, in turn, cause lubricant to be fed from the other monitoring chamber of the monitoring device to the other lubricant requiring element. On its alternate stroke, the feeder device will feed lubricant from the other feeder chamber simultaneously to the other lubricant requiring element and the other monitoring chamber of the monitoring device forcing lubricant from the one monitoring chamber of the monitoring device to the one lubricant requiring element. Now, by arranging the lubricant flow lines from a particular feeder chamber of the feeder device simultaneously to the associated lubricant requiring element and monitoring chamber of the monitoring device, if the lubricant flow line to the lubricant requiring element is broken so as to permit relatively free lubricant flow, there will not be sufficient back pressure to feed sufficient lubricant to the monitoring device to move the monitoring device divider so that it will remain stationary. Therefore, by preferably continuously sensing the movements of the monitoring device divider, such as with a proximity sensor, an immediate broken line detection is provided, that is, by the lack of movement of the monitoring device divider, and such broken line detection is accomplished without the requirement of detecting devices closely adjacent the various lubricant requiring elements being fed.

It is a further object of this invention to provide a pulse liquid feeder system of the type used in lubrication systems and the like of the foregoing general character which, when used as a multiple feeder device system, may be adapted for alternately feeding the main liquid supply into each of the feeder chambers of each of the feeder devices by the mere use of another of the feeder devices and no other alternate feed mechanism is required. In a preferred embodiment form and preferably making use of feeder cylinders as the feeder devices, where multiple feeder cylinders are involved, in addition to the feeder chambers at the opposite ends of the feeder cylinders, each feeder cylinder has intermediate chambers formed in the pistons thereof at opposite sides of the piston centerlines, although at all times spaced from the feeder chambers. With such feeder cylinders, by directing the main liquid supply for one of the feeder cylinders alternately through the intermediate chambers of another of the feeder cylinders, the reciprocal movements of this other of the feeder cylinders will alternately control the feeding of supply fluid into the one feeder cylinder presently requiring such supply fluid. By interconnecting the various feeder cylinders and their intermediate chambers in proper sequence, liquid feed into each feeder cylinder is properly alternately controlled by another feeder cylinder and this despite the fact that the improved monitoring devices of the present invention are properly intergrated into the overall system as hereinbefore described.

It is still a further object of this invention to provide a pulse liquid feeder system of the type used in lubrication systems and the like of the foregoing general character and whether including a single feeder device with its unique monitoring device or including multiple feeder devices with their unique monitoring devices, which not only includes the above discussed broken line detection in a unique and simplified manner, but also which may be very simply adapted to equally conveniently provide flow rate detection. With the feeder devices integrated with their respective monitoring devices for the broken line detection results, the same monitoring device reciprocal movements during normal operation of the feeder and monitoring devices may also be converted into a flow rate detection merely by converting the number of monitoring device movements over a determined period of time into the equivalent of actual flow rate. In other words, since a particular monitoring device is movable during each movement of its particular feeder device, by knowing the quantity of flow in each liquid feed line to a given restrictor, such as a bearing, it is relatively simple with modern equipment to convert and display the flow rate over a given period of time.

Other objects and advantages of the invention will be apparent from the following specification and the accompanying drawings which are for the purpose of illustration only.

DESCRIPTION OF THE BEST EMBODIMENTS CONTEMPLATED

The principles of the pulse liquid feeder system of the present invention are illustrated and described herein in a specific form for a specific purpose, but it is pointed out that such principles have relatively wide application for feeding many forms of liquid and for many purposes. However, the most prevalent and preferred use of the pulse liquid feeder system principles of the present invention is in pulse lubrication systems, particularly for pulse feeding lubricant to the vital and important bearings of manufacturing machines. Furthermore, the specific embodiment of the principles of the present invention illustrated herein is presently being used for pulse lubrication of the crank arm bearings of blank and draw presses in the can making industry.

Figure 1:
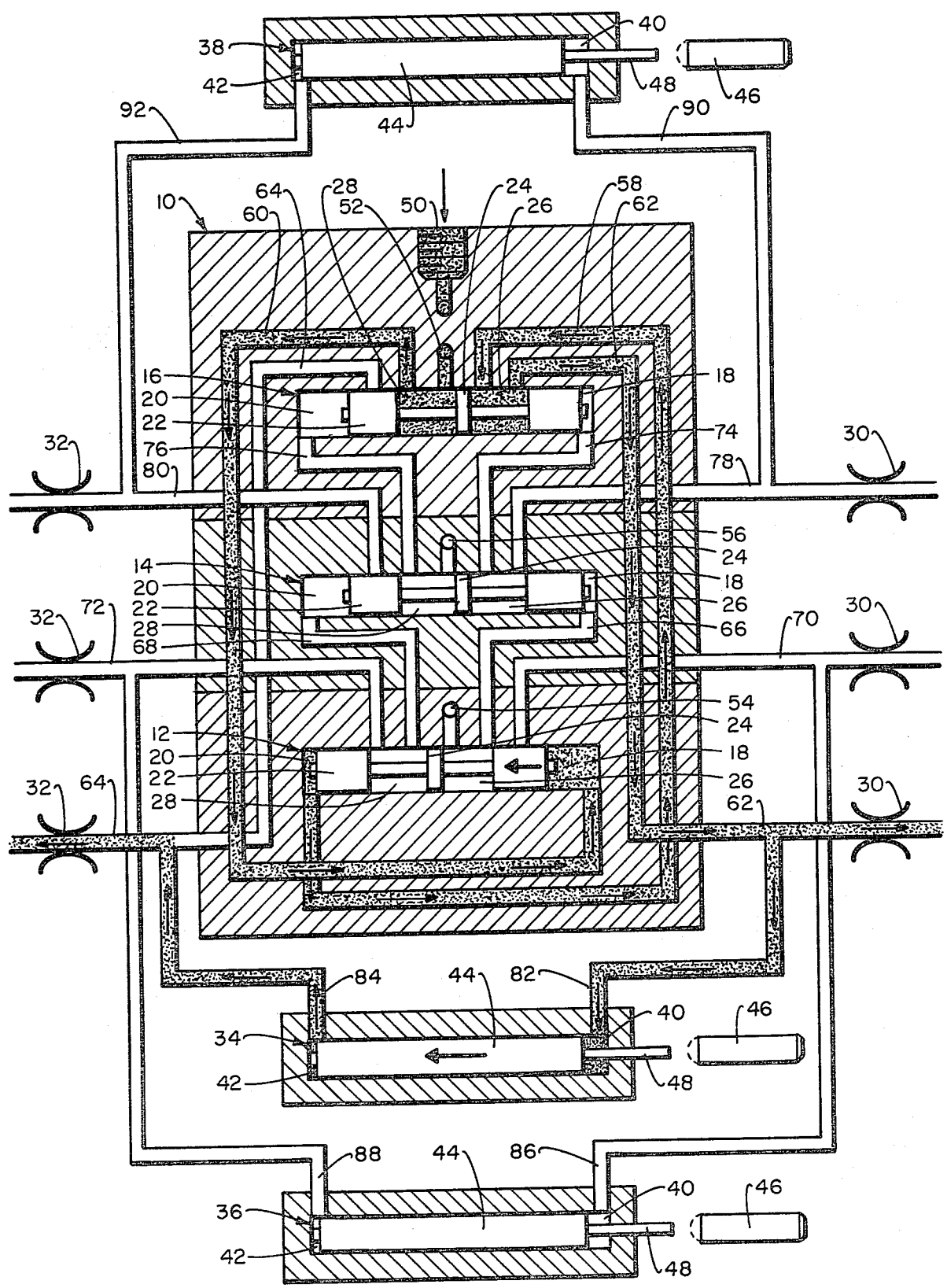
FIGS. 1 through 6 are sequential, somewhat diagramatic views showing a preferred embodiment of the pulse liquid feeder system of the present invention integrating three feeder devices with their respective monitoring devices and carrying out in sequence a complete operational cycle.

Referring to FIG. 1 of the drawings, a preferred embodiment of the principles of the present invention is illustrated as including a main cylinder block generally indicated at 10 having incorporated therein three feeder cylinders, merely specifically designated for later indentification in discussion thereof as an initial feeder cylinder generally indicated at 12, a following feeder cylinder generally indicated at 14 and a subsequent feeder cylinder generally indicated at 16. Each of the feeder cylinders 12, 14 and 16 has opposite end first and second feeder chambers 18 and 20 defined by a reciprocal feeder piston 22 alternately movable into each of the feeder chambers while moving from the other. Thus, each of the feeder cylinders 12, 14 and 16 is a double acting feeder cylinder.

Additionally, each of the feeder pistons 22 of the feeder cylinders 12, 14 and 16 has a pair of intermediate chambers formed therein at opposite sides of a centerline partition 24, namely, a first intermediate chamber 26 and a second intermediate chamber 28, and with these intermediate chambers thusly formed, it will be noted that they remain at all times spaced from the first and second feeder chambers 18 and 20 of the particular cylinder regardless of the movement of the particular feeder piston 22. Still further, each of the feeder cylinders 12, 14 and 16 is operably flow connected, as will be hereinafter described, for feeding lubricant to a pair of flow restriction means, each preferably including a bearing, such restriction means for each cylinder being designated as a first flow restrictor 30 and a second flow restrictor 32. Each of the first and second flow restrictors 30 and 32 for each of the feeder cylinders 12, 14 and 16, whether merely including bearings as a part thereof, or solely being bearings, or being some other form of flow restrictor, must provide a certain lubricant flow restriction to create lubricant flow back pressure of at least a given degree as will also be hereinafter discussed more in detail.

Particularly to the principles of the present invention, each of the feeder cylinders 12, 14 and 16 is operably lubricant flow connected to a monitoring cylinder, for purposes of identification designated as an initial monitoring cylinder generally indicated at 34, a following monitoring cylinder generally indicated at 36 and a subsequent monitoring cylinder generally indicated at 38. Each of the monitoring cylinders 34, 36 and 38 is also a double acting cylinder having opposite end first and second monitoring chambers 40 and 42 defined by a reciprocal monitoring piston 44 alternately movable into each while moving from the other. Also, the monitoring chambers 40 and 42 of each of the monitoring cylinders 34, 36 and 38 are less than one-half the maximum volumes of the respective first and second feeder chambers 18 and 20 of the respective feeder cylinders 12, 14 and 16.

Still further, each of the monitoring cylinders 34, 36 and 38 is provided with detection means preferably in the form of a properly positioned proximity sensor 46 for each. As shown, an indicating member 48 is preferably secured to each of the monitoring pistons 44 projecting axially or longitudinally through the first monitoring chamber 40 thereof and from the confines thereof to spaced from the particular proximity sensor 46. In a manner well known to those skilled in the art, the particular proximity sensor 46 can thereby sense the reciprocal movements of the particular monitoring cylinder monitoring piston 44 through the simultaneous movements of the particular indicating member 48, again for purposes to be hereinafter described. Each of the monitoring cylinders 34, 36 and 38 with their respective proximity sensors 46, although shown herein detached from the cylinder block 10 for purposes of clarity, may be mounted in assembly with the cylinder block in the usual manner.

To essentially complete the preferred embodiment assembly, the flow of pressurized liquid lubricant therethrough will be described but in the description of the various lubricant flow lines, it must be kept in mind that both the feeder cylinders 12, 14 and 16 and the monitoring cylinders 34, 36 and 38 have reciprocal feeder pistons 22 and monitoring pistons 44, respectively, with such reciprocations essentially controlling the various flow paths required for operation of the assembly. With this in mind, a main or primary supply line 50 feeds lubricant to the cylinder block 10 (such communication not shown) and to all of a secondary supply line 52 at the subsequent feeder cylinder 16, a secondary supply line 54 at the initial feeder cylinder 12 and a secondary supply line 56 at the following feeder cylinder 14. These respective secondary supply lines 52, 54 and 56 feed into either the first or second intermediate chamber 26 or 28 of the respective feeder cylinders 12, 14 and 16 depending on the reciprocal position of the particular feeder piston 22, that is, feeding into the second intermediate chamber 28 when the feeder piston 22 is to the right and feeding into the first intermediate chamber 26 when the feeder piston is to the left.

A primary flow line 58 always connects the first intermediate chamber 26 of the subsequent feeder cylinder 16 to the second feeder chamber 20 of the initial feeder cylinder 12, and a primary flow line 60 always connects the second intermediate chamber 28 of the subsequent feeder cylinder 16 to the first feeder chamber 18 of the initial feeder cylinder 12. When exposed thereto, a secondary flow line 62 connects the first intermediate chamber 26 of the subsequent feeder cylinder 16 to the first flow restrictor 30 of the initial feeder cylinder 12, and when exposed thereto, a secondary flow line 64 connects the second intermediate chamber 28 of the subsequent feeder cylinder 16 to the second flow restrictor 32 of the initial feeder cylinder 12.

A primary flow line 66 always connects the first intermediate chamber 26 of the initial feeder cyliner 12 to the first feeder chamber 18 of the following feeder cylinder 14, and a primary flow line 68 always connects the second intermediate chamber 28 of the initial feeder cylinder 12 to the second feeder chamber 20 of the following feeder cylinder 14. When exposed thereto, a secondary flow line 70 connects the first intermediate chamber 26 of the initial feeder cylinder 12 to the first flow restrictor 30 of the following feeder cylinder 14, and when exposed thereto, a secondary flow line 72 connects the second intermediate chamber 28 of the initial feeder cylinder 12 to the second flow restrictor 32 of the following feeder cylinder 14.

A primary flow line 74 always connects the first intermediate chamber 26 of the following feeder cylinder 14 to the first feeder chamber 18 of the subsequent feeder cylinder 16, and a primary flow line 76 always connects the second intermediate chamber 28 of the following feeder cylinder 14 to the second feeder chamber 20 of the subsequent feeder cylinder 16. When exposed thereto, a secondary flow line 78 connects the first intermediate chamber 26 of the following feeder cylinder 14 to the first flow restrictor 30 of the subsequent feeder cylinder 16, and when exposed thereto, a secondary flow line 80 connects the second intermediate chamber 28 of the following feeder cylinder 14 to the second flow restrictor 32 of the subsequent feeder cylinder 16.

Completing the flow line communication of the assembly, a monitoring flow line 82 always connects the first monitoring chamber 40 of the initial monitoring cylinder 34 to the secondary flow line 62 and the first flow restrictor 30 of the initial feeder cylinder 12, and a monitoring flow line 84 always connects the second monitoring chamber 42 of the initial monitoring cylinder 34 to the primary flow line 64 and the second flow restrictor 32. A monitoring flow line 86 always connects the first monitoring chamber 40 of the following monitoring cylinder 36 to the secondary flow line 70 and the first flow restrictor 30 of the following feeder cylinder 14, and a monitoring flow line 88 always connects the second monitoring chamber 42 of the following monitoring cylinder 36 to the secondary flow line 72 and the second flow restrictor 32 of the following feeder cylinder 14. Finally, a monitoring flow line 90 always connects the first monitoring chamber 40 of the subsequent monitoring cylinder 38 to the secondary flow line 78 and the first flow restrictor 30 of the subsequent feeder cylinder 16, and a monitoring flow line 92 always connects the second monitoring chamber 42 of the subsequent monitoring cylinder 38 to the secondary flow line 80 and the second flow restrictor 32 of the subsequent feeder cylinder 16.

The general required conditions for proper operation of the described assembly include the requirement that, as previously stated, the size or capacities of the monitoring cylinder monitoring chambers will be less than one-half the size or capacities of the feeder cylinder feeder chambers. Another condition is that the pressure of the main supply of liquid lubricant to the main or primary supply line 50 will be greater than the restriction pressures created by any of the first and second flow restrictors 30 and 32. Still another condition is that the various supply and flow lines will be sufficiently large to introduce negligible flow friction for the liquid lubricant within the system and in this regard, it is preferable to maintain the various supply and flow lines as short as possible. It is also vital that the restriction pressures created at any of the first and second flow restrictors 30 and 32 will be of sufficient magnitude to create a sufficient back pressure for forcing adequate liquid lubricant through the particular monitoring flow lines 82 through 92 to fill a particular of the monitoring chambers 40 or 42 and force a particular of the monitoring pistons 44 to the opposite end of that monitoring cylinder, and it is assumed in this preferred embodiment assembly that the first and second flow restrictors are substantially equal, although possibilities of unequal first and second flow restrictors will be discussed later.

In operation of this preferred embodiment assembly as described and shown, refer to FIG. 1 wherein the feeder pistons 22 of the following and subsequent feeder cylinders 14 and 16 are shown to the right. Also, the monitoring pistons 44 of the following and subsequent monitoring cylinders 36 and 38 are shown to the left. Now, at initiation, assume that the feeder piston 22 of the initial feeder cylinder 12 is likewise to the right and the monitoring piston 44 of the initial monitoring cylinder 34 is to the right.

Pressurized liquid lubricant will be directed from the main or primary supply line 50 through the secondary supply line 52 of the subsequent feeder cylinder 16, through the second intermediate chamber 28 of the subsequent feeder cylinder and through the primary flow line 60 into the first feeder chamber 18 of the initial feeder cylinder 12 forcing the feeder piston 22 of the initial feeder cylinder to the left as shown. This will force lubricant from the second feeder chamber 20 of the initial feeder cylinder 12 through the primary flow line 58, through the first intermediate chamber 26 of the subsequent feeder cylinder 16, through the secondary flow line 62 to the first flow restrictor 30 of the initial feeder cylinder 12 and, by back pressure, through the monitoring flow line 82 into the first monitoring chamber of the initial monitoring cylinder 34. The flow of lubricant into the first monitoring chamber 40 of the initial monitoring cylinder 34 will force the monitoring piston 44 of the initial monitoring cylinder to the left as shown, in turn, forcing lubricant through the monitoring flow line 84 to the second flow restrictor 32 of the initial feeder cylinder 12. Thus, the first flow restrictor 30 of the initial feeder cylinder 12 will receive the major portion of lubricant and the second flow restrictor 32 thereof will receive the minor portion.

Figure 2:
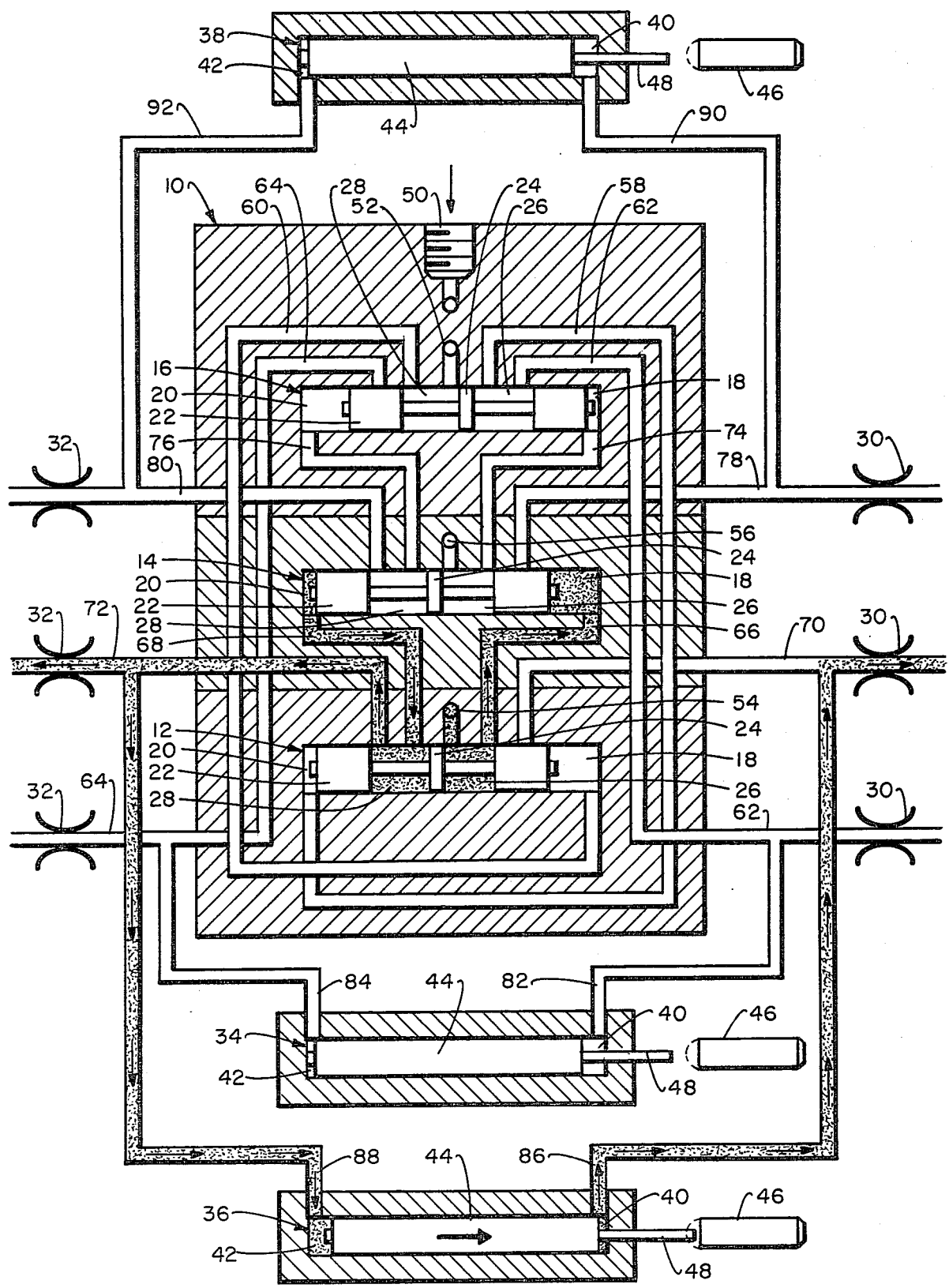

Once the feeder piston 22 of the initial feeder cylinder 12 has moved to the left, as shown FIG. 2, lubricant will flow from the secondary supply line 54 of the initial feeder cylinder 12 through the first intermediate chamber 26 of the initial feeder cylinder, through the primary flow line 66 into the first feeder chamber of the following feeder cylinder 14 forcing the feeder piston 22 thereof to the left as shown in FIG. 2. This will force lubricant from the second feeder chamber 20 of the following feeder cylinder 14 through the primary flow line 68, through the second intermediate chamber 28 of the initial feeder cylinder 12 and through the secondary flow line 72 to the second flow restrictor 32 of the following feeder cylinder 14. The back pressure of this second flow restrictor 32 will force lubricant through the monitoring flow line 88 into the second monitoring chamber 42 of the following monitoring cylinder 36 moving the monitoring piston 44 thereof to the right as shown forcing lubricant from the first monitoring chamber 40 thereof through the monitoring flow line 86 to the second flow restrictor 30 of the following feeder cylinder 14. Thus, a major portion of lubricant will be directed to the second flow restrictor 32 of the following feeder cylinder 14 and a minor portion thereof to the first flow restrictor 30 thereof.

Figure 3:
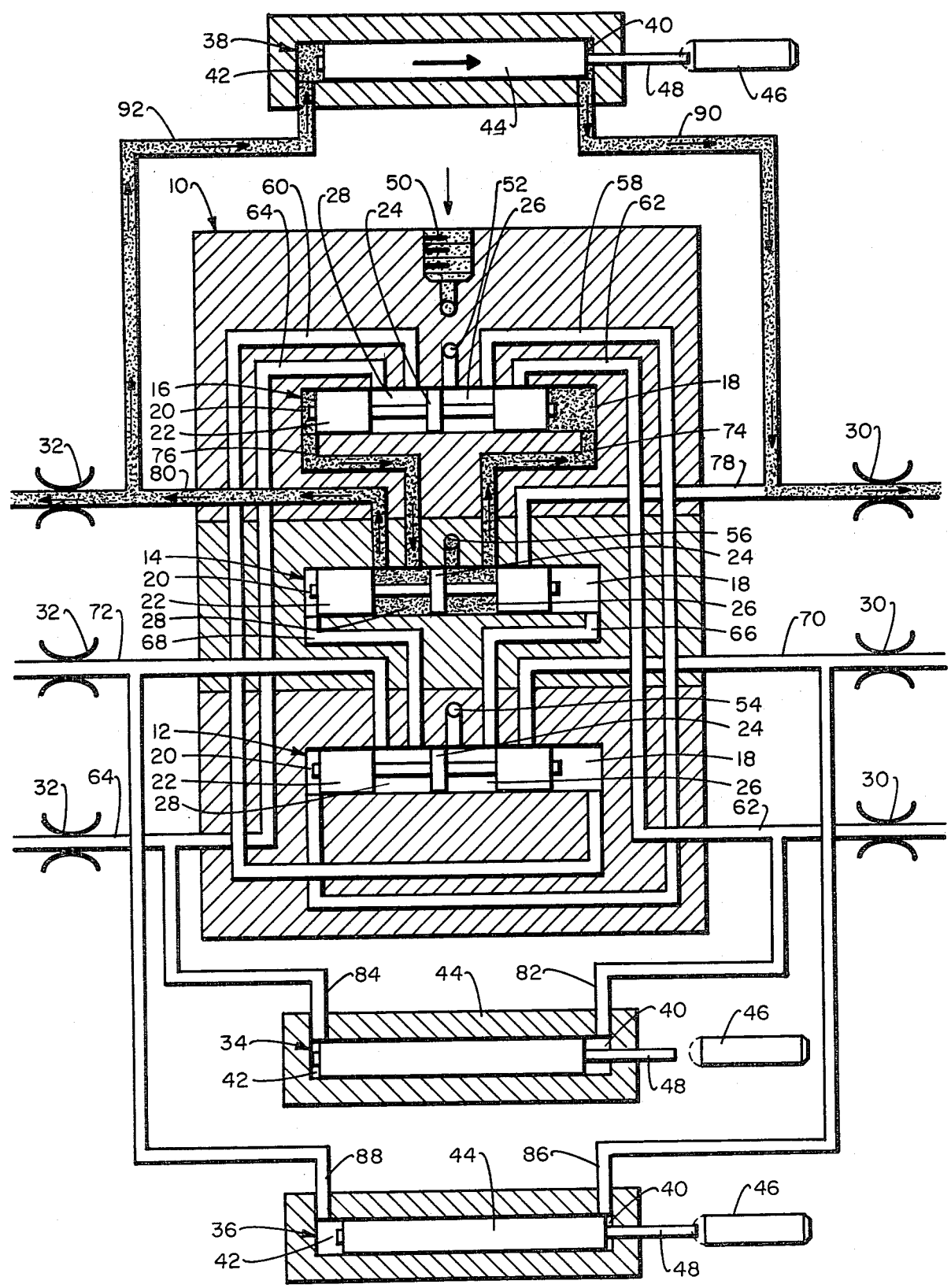

Continuing in sequence, movement of the feeder piston 22 of the following feeder cylinder 14 to the left and now referring to FIG. 3, causes lubricant to flow from the secondary supply line 56 through the first intermediate chamber 26 of the following feeder cylinder 14 and through the primary flow line 74 to the first feeder chamber 18 of the subsequent feeder cylinder 16 forcing the feeder piston 22 thereof to the left as shown. This forces lubricant from the second feeder chamber 20 of the subsequent feeder cylinder 16 through the primary flow line 76, through the second intermediate chamber 28 of the following feeder cylinder 14 and through the secondary flow line 80 to the second flow restrictor 32 of the subsequent feeder cylinder 16. The back pressure of the second flow restrictor 32 of the subsequent feeder cylinder 16 forces lubricant through the monitoring flow line 92 to the second monitoring chamber 42 of the subsequent monitoring cylinder 38 forcing the monitoring piston 44 thereof to the right as shown and thereby forcing lubricant from the first monitoring chamber 40 thereof through the monitoring flow line 90 to the first flow restrictor 30 of the subsequent feeder cylinder 16. In this portion of the cycle, therefore, the second flow restrictor 32 of the subsequent feeder cylinder 16 receives the major portion of lubricant and the first flow restrictor 30 thereof receives the minor portion.

Figure 4:
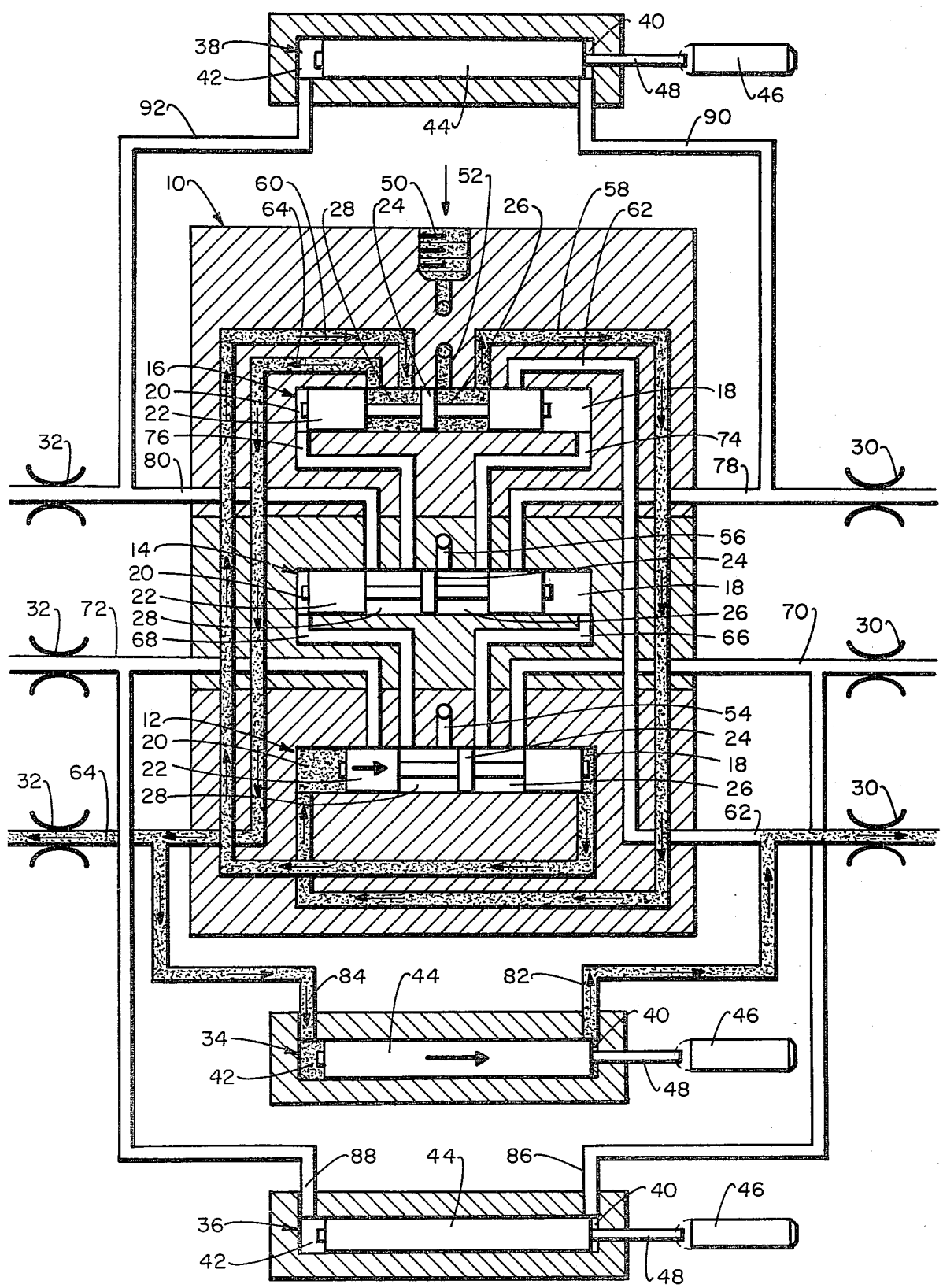
Figure 5:
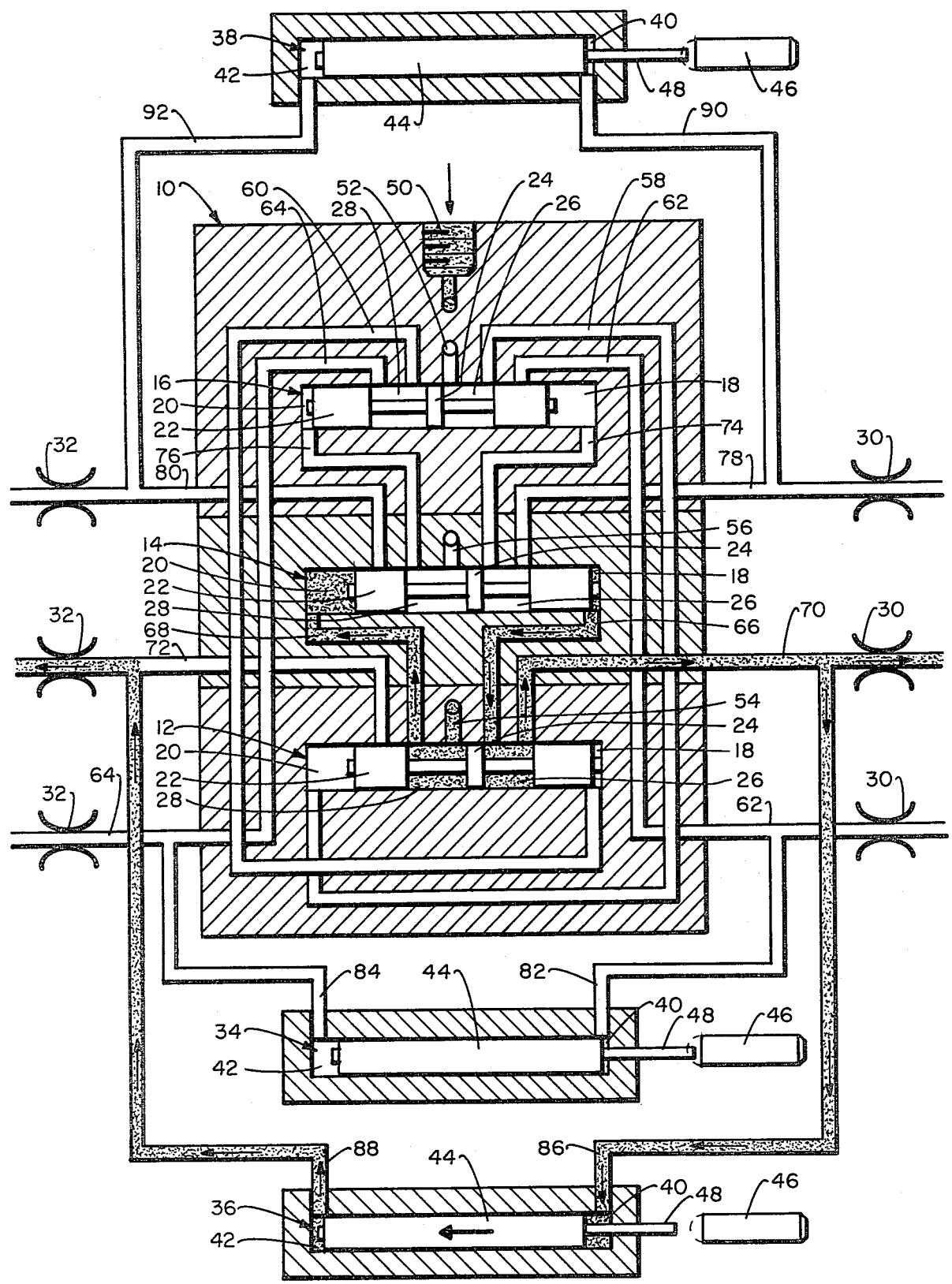
Figure 6:
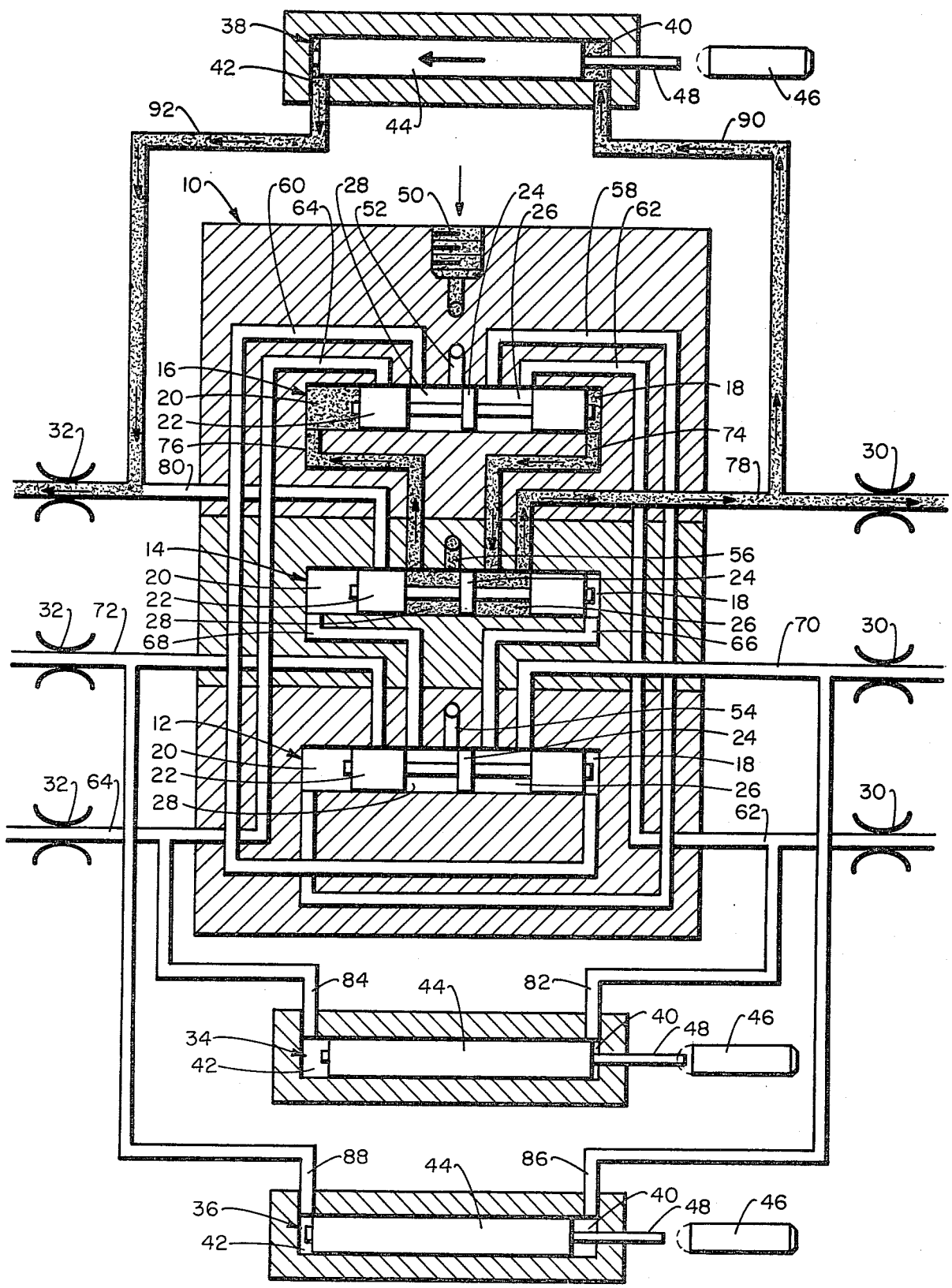

Although the remaining three steps of a complete cycle of the assembly may be similarly traced through in detail as shown respectively in FIGS. 4, 5 and 6, it is believed sufficient to refer those skilled in the art to the various flow directional arrows of FIGS. 4, 5 and 6 and minimize such description. Referring to FIG. 4, therefore, movement of the feeder piston 22 of the subsequent feeder cylinder 16 to the left as shown causes supply lubricant to flow into the second feeder chamber 20 of the initial feeder cylinder 12 forcing the feeder piston 22 thereof to the right causing lubricant flow from the first feeder chamber 18 thereof to supply a major lubricant portion to the second flow restrictor 32 of that initial feeder cylinder, and causing a minor lubricant portion to move the monitoring piston 44 of the initial monitoring cylinder 44 to the right for feeding that minor lubricant portion to the first flow restrictor 30 of that initial feeder cylinder. As shown in FIG. 5, the operational sequence is continued with the movement of the feeder piston 22 of the following feeder cylinder 14 to the right as caused by the initial feeder cylinder 12 moving to the right directing a major portion of the lubricant from the first feeder chamber 18 of the following feeder cylinder to the first flow restrictor 30 of the following feeder cylinder, and directing a minor portion of lubricant to and from the following monitoring cylinder 36 by the monitoring piston 44 thereof moving to the left and supplying that minor lubricant portion to the second flow restrictor 32 of the following feeder cylinder. The final step in the operational sequence is shown in FIG. 6 wherein the movement of the feeder piston 22 of the following feeder cylinder 14 to the right causes lubricant feed to the subsequent feeder cylinder 16 moving the feeder piston 22 thereof to the right and supplying a major lubricant portion to the first flow restrictor 30 of that subsequent feeder cylinder, while the minor lubricant portion is fed through the subsequent monitoring cylinder 38 moving the monitoring piston 44 thereof to the left so that the minor lubricant portion is fed to the second flow restrictor 32 of the subsequent feeder cylinder.

Upon completion of the sixth step of the operating cycle, the assembly is once again returned to the various feeder and monitoring cylinder positions ready for the operational step shown in FIG. 1, all of the feeder pistons 22 of the feeder cylinders 14, 16 and 18 being to the right ready for the feeder piston of the initial feeder cylinder 12 to move to the left and the monitoring pistons 44 of the following and subsequent monitoring cylinders being to the left with the monitoring piston of the initial monitoring cylinder 34 being to the right ready for its movement to the left. Thus, during one complete cycle of the assembly, each of the first and second flow restrictors 30 and 32 of each of the feeder cylinders 12, 14 and 16 is pulse fed a major charge of liquid lubricant and, according to the principles of the present invention, is also pulse fed a minor charge of liquid lubricant. This continuous repeat cycling of the assembly providing the very vital lubrication to the various first and second flow restrictors 30 and 32, for instance, including vital bearings of a blank and draw press used in the can making industry, is repeated indefinitely during operation of the particular machine with which it is integrated as long as the various lubricant flow lines to the various flow restrictors remain intact.

Most important and according to the principles of the present invention, during the operation of the machine and the continuous cycling of the pulse liquid feeder system, the flow of liquid lubricant through the various flow lines to the first and second flow restrictors 30 and 32 may be constantly monitored since for each lubricant feed step, one of the monitoring pistons 44 of one of the monitoring cylinders 34, 36 and 38 will move and this will be constantly indicated if these movements continue by the various indicating members 48 and their proximity sensors 46 integrated with the monitoring cylinders. If the main feed of liquid lubricant to the entire assembly through the main or primary supply line 50 is interrupted, cessation of flow will be indicated by all of the proximity sensors 46 since the movements of all of the monitoring cylinders 34, 36 and 38 will cease. Also, interruption of lubricant flow to any one of the first and second flow restrictors 30 and 32 will be indicated by the particular proximity sensor 46 of the monitoring cylinder associated with that particular flow restrictor so that in this case, by a particular monitoring cylinder being stationary and the piston thereof being stationary in a particular position, it is possible through the associated proximity sensor to determine which supply line has ruptured.

Still further, under normal operating conditions of the pulse liquid feeder system assembly, since the proximity sensors 46 are constantly monitoring the reciprocal movements of the monitoring pistons 44 within the monitoring cylinders 34, 36 and 38, it is possible through indications of the proximity sensors, to monitor the liquid or, in this case, the lubricant flow rate to each of the first and second flow restrictors 30 and 32. Through the proximity sensors 46, the numbers of reciprocal movements may be counted for a given period of time by various well known means and by knowing the feeder chamber capacities of the feeder cylinders 12, 14 and 16 and the monitoring chamber capacities of the monitoring cylinders 34, 36 and 38, the flow rates may be determined in various well known manners. Thus, flow rate detection may be added to the vital broken line detection according to the principles of the present invention.

In the foregoing description of the preferred embodiment of the pulse liquid feeder system, it was stated that the first and second flow restrictors 30 and 32 for the system were assumed to be approximately equal as to their flow restriction results. Through experimentation and calculation, however, it is believed that this is not necessarily true for successful operation of this and other pulse liquid feeder systems according to the present invention. As previously stated, is known that the maximum volumes or capacities of the feeder chambers 18 and 20 must be more than double the maximum volumes or capacities of the associated first and second monitoring chambers 40 and 42, stated in a different way, the monitoring chambers being less than fifty per cent of the feeder chambers.

Now it is also believed that the resulting flow restrictions produced by each of the first and second flow restrictors 30 and 32 may vary or be unequal, one to the other, over a relatively wide range while still producing the intended results. Broadly stated, as the flow restrictors become less equal, the flow to the particular flow restrictor directly from the feeder cylinder must be proportionately greater than the flow to the monitoring cylinder. As an illustration of the guidelines, if the flow restrictors are approximately equal, although the flow from the particular feeder cylinder directly to a flow restrictor must be greater than that to the monitoring cylinder, in this instance, it would only be required to be slightly more with the flow restrictors creating sufficient back pressure to force the slightly less flow to the monitoring cylinder and moving the monitoring cylinder its intended stroke. At the other end of the spectrum, if one flow restrictor is approximately twenty-five per cent of the other, the flow from the feeder cylinder directly to a flow restrictor must be approximately ninety-five per cent of the total feeder cylinder flow and only five per cent of the flow would be directed to the monitoring cylinder. It is believed that these two limitation extremes fairly well define the range of operation and between these limitation extremes, the restriction and flow values can be approximately proportionately calculated.

Still additionally, and again noting that the preferred embodiment of the pulse liquid feeder system of the present invention has been illustrated and described making use of three feeder cylinders, three monitoring cylinders and three sets of flow restrictors, it is pointed out that a much simpler system is possible involving the same inventive principles. First, assume a pulse liquid feeder system only involving a single feeder device, a single monitoring device and a single pair of associated flow restrictors, the feeder and monitoring devices need not be cylinders, but can be devices merely having opposed feeder or monitoring chambers separated by a flexible divider reciprocal or alternately movable into each chamber while moving from the other. Any of a multiplicity of known devices may be used for alternately feeding the main liquid supply into the feeder chambers of the feeder device, for instance, an alternately liquid feeding device mechanically driven from the machine being lubricated having some arrangement of chambers similar to the intermediate chamber arrangement of the feeder cylinders of the preferred embodiment, or other mechanically driven alternatively liquid feeding devices which can control the main feed of pressurized liquid and alternately feed sufficient volumes thereof for filling the feeder chambers.

At the same time, if the more simplified feeder devices are used not involving the supplementary intermediate chambers, any number of feeder and monitoring devices feeding the appropriate sets of flow restrictors may be assembled for operation in sequence. Without one feeder device providing the alternate feeding of the main liquid supply into the feeder chambers of another feeder device, the added requirement again would be the separately mechanically driven mechanism or mechanisms for alternately supplying the main feed supply of liquid to the feeder chambers of the various devices just as with the above described pulse liquid feeder system making use of only a single feeder device. Thus, this simplified form of feeder device is applicable for virtually any pulse liquid feeder system containing any number of feeder devices just as with use of feeder devices in the form of feeder cylinders.

Finally, it is pointed out that the preferred embodiment of the pulse liquid feeder system described above could be easily adapted to a system involving two or more feeder cylinders and operable in the identical manner to that described relative to the preferred embodiment. As an example, with a system involving only two feeder cylinders, the following feeder cylinder 14 with its following monitoring cylinder 36 and first and second flow restrictors 30 and 32 would merely be eliminated and the initial feeder cylinder 12 connected integrated directly with the subsequent feeder cylinder 16 in the manner obvious to those skilled in the art. At the same time, if four or more feeder cylinders are integrated into the pulse liquid feeder system, it would just be necessary to provide additional feeder and monitoring cylinders with their sets of flow restrictors connected intermediately in sequence in the same manner as the following feeder cylinder 14 as described in the preferred embodiment.

According to the principles of the present invention, therefore, a pulse liquid feeder system is provided of the type for use in lubrication systems of industrial production machinery incorporating a unique broken line detection and also, if desired, a unique flow rate detection. The unique pulse liquid feeder system may take on various forms, that is, relatively simplified or relatively sophisticated, all of which will produce the same basic unique results. Furthermore, the pulse liquid feeder system of the present invention is adaptable to any size of system, whether involving a single feeder device or virtually any number of feeder devices, again while producing the described unique results. Thus, it is not intended to limit the principles of the present invention to the specific forms described, but rather the principals thereof should be broadly construed and only restricted within the specific limitations of the appended claims including the patent equivalents thereof.

I claim:

1. In a pulse liquid feeder system of the type having opposed first and second feeder chambers separated by a reciprocal feeder divider alternately movable into each while moving from the other, and alternate feeder means flow connected to said feeder chambers for alternately supplying liquid to said feeder chambers to reciprocate said divider; the improvements comprising: opposed first and second monitoring chambers separated by a reciprocal monitoring divider alternately movable into each while moving from the other, said monitoring chambers having maximum volumes less than one-half that of said feeder chambers; first liquid flow restriction means flow connected to said second feeder chamber and said first monitoring chamber, second liquid flow restriction means flow connected to said first feeder chamber and said second monitoring chamber, each of said liquid flow restriction means being constructed and arranged always exerting sufficient back pressure when receiving liquid from its respective flow connected feeder chamber to simultaneously force sufficient liquid into its respective flow connected monitoring chamber for moving said monitoring divider fully out of its respective flow connected monitoring chamber fully into the other of said monitoring chambers forcing liquid flow therefrom and to the other of said liquid flow restriction means; detection means for detecting reciprocal movements of said monitoring divider.

2. In a pulse liquid feeder system as defined in claim 1 in which said detection means includes a proximity sensor positioned detecting said reciprocal movements of said monitoring divider.

3. In a pulse liquid feeder system as defined in claim 1 in which said detection means includes an indicator member operably connected movable with said monitoring divider, a proximity sensor positioned detecting reciprocal movements of said indicator member and thereby said reciprocal movements of said monitoring divider.

4. In a pulse liquid feeder system as defined in claim 1 in which one of said liquid flow restriction means includes a bearing.

5. In a pulse liquid feeder system as defined in claim 1 in which said first and second liquid flow restriction means each include a bearing.

6. In a pulse feeder system as defined in claim 1 in which said first and second feeder chambers and said reciprocal feeder divider are formed by a double acting feeder cylinder with opposite end first and second feeder chambers defined by a reciprocal feeder piston; and in which said first and second monitoring chambers and said reciprocal monitoring divider are formed by a double acting monitoring cylinder with opposite end first and second monitoring chambers defined by a reciprocal monitoring piston.

7. In a pulse liquid feeder system as defined in claim 1 in which said detection means includes a proximity sensor positioned detecting said reciprocal movements of said monitoring divider: and in which one of said liquid flow restriction means includes a bearing.

8. In a pulse liquid feeder system as defined in claim 1 in which said detection means includes a proximity sensor positioned detecting said reciprocal movements of said monitoring divider: in which said first and second feeder chambers and said reciprocal feeder divider are formed by a double acting feeder cylinder with opposite end first and second feeder chambers defined by a reciprocal feeder piston; and in which said first and second monitoring chambers and said reciprocal monitoring divider are formed by a double acting monitoring cylinder with opposite end first and second monitoring chambers defined by a reciprocal monitoring piston.

9. In a pulse liquid feeder system as defined in claim 1 in which said detection means includes an indicator member operably connected movable with said monitoring divider, a proximity sensor positioned detecting reciprocal movements of said indicator member and thereby said reciprocal movements of said monitoring divider: in which said first and second feeder chambers and said reciprocal feeder divider are formed by a double acting feeder cylinder with opposite end first and second feeder chambers defined by a reciprocal feeder piston; and in which said first and second monitoring chambers and said reciprocal monitoring divider are formed by a double acting monitoring cylinder with opposite end first and second monitoring chambers defined by a reciprocal monitoring piston.

10. In a pulse liquid feeder system as defined in claim 1 in which said first and second liquid flow restriction means each include a bearing; in which said first and second feeder chambers and said reciprocal feeder divider are formed by a double acting feeder cylinder with opposite end first and second feeder chambers defined by a reciprocal feeder piston; and in which said first and second monitoring chambers and said reciprocal monitoring divider are formed by a double acting monitoring cylinder with opposite end first and second monitoring chambers defined by a reciprocal monitoring piston.

11. In a pulse liquid feeder system as defined in claim 1 in which said first and second feeder chambers and said reciprocal feeder divider are formed by a double acting feeder cylinder with opposite end first and second feeder chambers defined by a reciprocal feeder piston; in which said first and second monitoring chambers and said reciprocal monitoring divider are formed by a double acting monitoring cylinder with opposite end first and second monitoring chambers defined by a reciprocal monitoring piston; in which said pulse liquid feeder system includes at least two sets of similar feeder and monitoring cylinders similarly connected to first and second liquid flow restriction means and a monitoring cylinder; in which each of said feeder cylinders includes a first intermediate chamber formed in the piston thereof at a side of a piston centerline toward said first feeder chamber but at all times spaced therefrom and a second intermediate chamber formed in the piston thereof at a side of said piston centerline toward said second feeder chamber but at all times spaced therefrom; in which said alternate feeder means alternately supplying said liquid to said feeder chambers includes said first and second intermediate chambers of each one of said feeder cylinders during movement of said one feeder cylinder piston being constructed and arranged for alternately feeding liquid from a main liquid supply to first and second feeder chambers and from said first and second feeder chambers to first and second liquid flow restriction means and said monitoring cylinder of the other feeder cylinders.

12. In a pulse liquid feeder system as defined in claim 11 in which each of said detection means includes a proximity sensor positioned for detecting reciprocal movements of that monitoring cylinder piston.

13. In a pulse liquid feeder system as defined in claim 11 in which each of said detection means includes an indicator member operably connected movable with that monitoring cylinder piston, and a proximity sensor positioned for detecting said indicator member movements.

14. In a pulse liquid feeder system as defined in claim 11 in which all of said restriction means include bearings.

15. In a pulse liquid feeder system as defined in claim 1 in which said first and second feeder chambers and said reciprocal feeder divider are formed by a double acting feeder cylinder with opposite end first and second feeder chambers defined by a reciprocal feeder piston; in which said first and second monitoring chambers and said reciprocal monitoring divider are formed by a double acting monitoring cylinder with opposite end first and second monitoring chambers defined by a reciprocal monitoring piston; in which said pulse liquid feeder system includes three sets of similar feeder and monitoring cylinders similarly connected to first and second liquid flow restriction means; in which each of said feeder cylinders includes a first intermediate chamber formed in the piston thereof at side of a piston centerline toward said first feeder chamber but at all times spaced therefrom and a second intermediate chamber formed in the piston thereof at a side of said piston centerline toward said second feeder chamber but at all times spaced therefrom; in which said alternate feeder means alternately supplying said liquid to said feeder chambers includes said first and second intermediate chambers of an initial of said feeder cylinders during movement of said initial feeder cylinder piston being constructed and arranged for alternately feeding liquid from a main liquid supply to first and second feeder chambers and from said first and second feeder chambers to first and second liquid flow restriction means and said monitoring cylinder of a following of said feeder cylinders, said intermediate chambers of said following feeder cylinder being constructed and arranged similarly connected to said first and second feeder chambers and said first and second liquid flow restriction means and said monitoring cylinder of a subsequent of said feeder cylinders, said intermediate chambers of said subsequent feeder cylinder being constructed and arranged similarly connected to said first and second feeder chambers and said first and second liquid flow restriction means and said monitoring cylinder of said initial feeder cylinder; and in which said detection means includes detection means for detecting reciprocal movements of each of said monitoring cylinder pistons.

16. In a pulse liquid feeder system as defined in claim 15 in which each of said detection means includes a proximity sensor positioned for detecting reciprocal movements of said monitoring cylinder piston.

17. In a pulse liquid feeder system as defined in claim 15 in which each of said detection means includes an indicator member operably connected movable with said monitoring cylinder piston, and a proximity sensor positioned for detecting said indicator member movements.

18. In a pulse liquid feeder system as defined in claim 15 in which all of said restriction means include bearings.

19. In a method of pulse feeding a liquid, the steps of: alternately feeding liquid to opposite first and second feeder chambers separated by a reciprocal feeder divider alternately movable into each while moving from the other; by said feeder divider movement, alternately feeding liquid from said second feeder chamber during said feeding into said first feeder chamber and from said first feeder chamber during said feeding into said second feeder chamber; during said liquid feeding from said second feeder chamber, feeding said liquid simultaneously to a first flow restriction and to a first monitoring chamber separated from a second monitoring chamber by a reciprocal monitoring divider alternately movable into each while moving from the other, said feeding of said liquid into said first monitoring chamber moving said monitoring divider into said second monitoring chamber feeding liquid therefrom to a second flow restriction; during said liquid feeding from said first feeder chamber, feeding said liquid simultaneously to said second flow restriction and to said second monitoring chamber to move said monitoring divider onto said first monitoring chamber to feed liquid from said first monitoring chamber to said first flow restriction; detecting reciprocal movements of said monitoring divider.

20. In a method of pulse feeding a liquid as defined in claim 19 in which said step of detecting reciprocal movements of said monitoring divider includes using a proximity sensor for detecting said reciprocal movements.

21. In a method of pulse feeding a liquid as defined in claim 19 in which said step of detecting reciprocal movements of said monitoring divider includes moving an indicator exactly with said monitoring divider movements, and using a proximity sensor to detect said movements of said indicator.

22. In a method of pulse feeding a liquid as defined in claim 19 in which said steps of feeding said liquid simultaneously to a first flow restriction and to a first monitoring chamber and feeding said liquid simultaneously to said second flow restriction and to said second monitoring chamber each include using a back pressure of liquid being fed to a particular of said flow restrictions to feed liquid to a particular of said monitoring chambers.

23. In a method of pulse feeding a liquid as defined in claim 19 in which said steps of feeding said liquid simultaneously to said first flow restriction and to said first monitoring chamber and feeding said liquid simultaneously to said second flow restriction and to said second monitoring chamber include feeding said liquid to a bearing of the particular of said flow restrictions.

24. In a method of pulse feeding a liquid as defined in claim 19 in which said steps of feeding said liquid simultaneously to a first flow restriction and to a first monitoring chamber and feeding said liquid simultaneously to said second flow restriction and to said second monitoring chamber include the using of back pressure on said liquid created at a particular of said flow restrictions to feed said liquid to a particular of said monitoring chambers; and in which said step of detecting reciprocal movements of said monitoring divider includes using a proximity sensor to detect said monitoring divider movements.

25. In a method of pulse feeding a liquid as defined in claim 19 in which said steps of feeding said liquid simultaneously to a first flow restriction and to a first monitoring chamber and feeding said liquid simultaneously to said second flow restriction and to said second monitoring chamber include the using of back pressure on said liquid created at a particular of said flow restrictions to feed said liquid to a particular of said monitoring chambers; and in which said step of detecting reciprocal movements of said monitoring divider includes moving an indicator exactly with said monitoring divider, and using a proximity sensor to detect movements of said indicator.

26. In a method of pulse feeding a liquid as defined in claim 19 in which said steps of feeding said liquid simultaneously to a first flow restriction and to a first monitoring chamber and feeding said liquid simultaneously to said second flow restriction and to said second monitoring chamber include the using of back pressure on said liquid created at a particular of said flow restrictions to feed said liquid to a particular of said monitoring chambers, feeding said liquid to a bearing of each of said flow restrictions.

27. In a method of pulse feeding a liquid as defined in claim 19 in which said steps of feeding said liquid simultaneously to a first flow restriction and to a first monitoring chamber and feeding said liquid simultaneously to said second flow restriction and to said second monitoring chamber include the using of back pressure on said liquid created at a particular of said flow restrictions to feed said liquid to a particular of said monitoring chambers, feeding said liquid to a bearing of each of said flow restrictions; and in which said step of detecting reciprocal movements of said monitoring divider includes using a proximity sensor to detect said monitoring divider movements.

28. In a method of pulse feeding a liquid as defined in claim 19 in which said step of alternately feeding liquid to opposite first and second feeder chambers includes alternately feeding said liquid to opposite end feeder cylinder first and second feeder chambers separated by a reciprocal feeder piston alternately movable into each while moving from the other; and in which said step of feeding said liquid simultaneously to a first flow restriction and to a first monitoring chamber separated from a second monitoring chamber includes feeding said liquid simultaneously to a first flow restriction and to a first monitoring chamber of opposite end monitoring cylinder first and second monitoring chambers separated by a reciprocal monitoring piston alternately movable into each while moving from the other.

29. In a method of pulse feeding a liquid as defined in claim 28 in which said step of detecting reciprocal movements of said monitoring divider includes using a proximity sensor to detect said monitoring piston movements.

30. In a method of pulse feeding a liquid as defined in claim 28 in which said steps of feeding said liquid simultaneously to a first flow restriction and to a first monitoring chamber and feeding said liquid simultaneously to said second flow restriction and to said second monitoring chamber include using back pressure of said liquid being fed to a particular of said flow restrictions to feed said liquid to the particular of said monitoring chambers.

31. In a method of pulse feeding a liquid as defined in claim 28 in which said steps of feeding said liquid simultaneously to a first flow restriction and to a first monitoring chamber and feeding said liquid simultaneously to said second flow restriction and to said second monitoring chamber include using back pressure of said liquid being fed to a particular of said flow restrictions to feed said liquid to the particular of said monitoring chambers; and in which said step of detecting reciprocal movements of said monitoring divider includes using a proximity sensor to detect said monitoring piston movements.

32. In a method of pulse feeding a liquid as defined in claim 19 in which said step of alternately feeding liquid to opposite first and second feeder chambers includes alternately feeding said liquid to opposite end feeder cylinder first and second feeder chambers separated by a reciprocal feeder piston alternately movable into each while moving from the other; in which said step of feeding said liquid simultaneously to a first flow restriction and to a first monitoring chamber separated from a second monitoring chamber includes feeding said liquid simultaneously to a first flow restriction and to a first monitoring chamber of opposite end monitoring cylinder first and second monitoring chambers separated by a reciprocal monitoring piston alternately movable into each while moving from the other; in which said method is carried out using at least two sets of similar and similarly liquid flow connected feeder and monitoring cylinders with their first and second flow restrictions; in which said method includes the steps of controlling liquid flow alternately into feeder chambers of each one of said feeder cylinders and alternately from said each one feeder cylinder feeder chambers to the monitoring cylinder and first and second flow restrictions by the use of intermediate chambers of the other of said feeder cylinders; and in which said step of detecting reciprocal movements of said monitoring divider includes detecting reciprocal movements of said monitoring pistons of each of said monitoring cylinders.

33. In a method of pulse feeding a liquid as defined in claim 32 in which said step of detecting reciprocal movements of said monitoring pistons of said monitoring cylinders includes detecting said reciprocal movements of said monitoring pistons by proximity sensors.

34. In a method of pulse feeding a liquid as defined in claim 32 in which said steps of feeding said liquid simultaneously to said first or second flow restrictions and to said first or second monitoring chambers include using back pressure of liquid fed to a particular of said flow restrictions to feed liquid to the associated of said monitoring chambers.

35. In a method of pulse feeding a liquid as defined in claim 19 in which said step of alternately feeding liquid to opposite first and second feeder chambers includes alternately feeding said liquid to opposite end feeder cylinder first and second feeder chambers separated by a reciprocal feeder piston alternately movable into each while moving from the other; in which said step of feeding said liquid simultaneously to a first flow restriction and to a first monitoring chamber separated from a second monitoring chamber includes feeding said liquid simultaneously to a first flow restriction and to a first monitoring chamber of opposite end monitoring cylinder first and second monitoring chambers separated by a reciprocal monitoring piston alternately movable into each while moving from the other; in which said method is carried out using at least three sets of similar and similarly liquid flow connected feeder and monitoring cylinders with their first and second flow restrictions; in which said method includes the steps of controlling liquid flow alternately into feeder chambers of a following of said feeder cylinders and alternately from said following feeder cylinder feeder chambers to the monitoring cylinder and first and second flow restrictions by the use of intermediate chambers of an initial of said feeder cylinders, controlling liquid flow alternately into feeder chambers of a subsequent of said feeder cylinders and alternately from said subsequent feeder cylinder feeder chambers to the monitoring cylinder and first and second flow restrictions by the use of intermediate chambers of said following feeder cylinder, controlling liquid flow alternately into feeder chambers of said initial of said feeder cylinders and alternately from said initial feeder cylinder feeder chambers to the monitoring cylinder and first and second flow restrictions by the use of intermediate chambers of said subsequent of said feeder cylinders; and in which said step of detecting reciprocal movements of said monitoring divider includes detecting reciprocal movements of said monitoring pistons of each of said monitoring cylinders.

36. In a method of pulse feeding a liquid as defined in claim 35 in which said step of detecting reciprocal movements of said monitoring pistons of said monitoring cylinders includes detecting said reciprocal movements of said monitoring pistons by proximity sensors.

37. In a method of pulse feeding a liquid as defined in claim 35 in which said steps of feeding said liquid simultaneously to said first and second flow restrictions and to said first or second monitoring chambers includes using back pressure of liquid fed to a particular of said flow restrictions to feed liquid to the associated of said monitoring chambers.

* * * * *